United States Patent
Ryu et al.

(10) Patent No.: US 10,582,566 B2
(45) Date of Patent: *Mar. 3, 2020

(54) METHOD AND APPARATUS FOR TRIGGERING UPLINK DATA IN WIRELESS LAN

(71) Applicant: LG ELECTRONICS INC., Seoul (KR)

(72) Inventors: Kiseon Ryu, Seoul (KR); Suhwook Kim, Seoul (KR); Jinyoung Chun, Seoul (KR); Jeongki Kim, Seoul (KR); Giwon Park, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/358,601

(22) Filed: Mar. 19, 2019

(65) Prior Publication Data

US 2019/0215905 A1  Jul. 11, 2019

Related U.S. Application Data

(63) Continuation of application No. 15/925,663, filed on Mar. 19, 2018, now Pat. No. 10,271,377, which is a
(Continued)

(51) Int. Cl.
*H04W 84/12* (2009.01)
*H04W 28/02* (2009.01)
(Continued)

(52) U.S. Cl.
CPC .......... *H04W 84/12* (2013.01); *H04L 47/10* (2013.01); *H04W 28/021* (2013.01);
(Continued)

(58) Field of Classification Search
CPC .............. H04W 84/12; H04W 28/021; H04W 28/0278; H04W 72/0413; H04W 74/004;
(Continued)

(56) References Cited

U.S. PATENT DOCUMENTS

| 9,923,822 B2 | 3/2018 | Merlin et al. |
| 2012/0008572 A1 | 1/2012 | Gong et al. |

(Continued)

FOREIGN PATENT DOCUMENTS

| JP | 2010141773 | 6/2010 |
| JP | 2011234356 | 11/2011 |

(Continued)

OTHER PUBLICATIONS

Japan Patent Office Application Serial No. 2017-510503, Notice of Allowance dated Dec. 11, 2017, 3 pages.

(Continued)

*Primary Examiner* — Duc C Ho
(74) *Attorney, Agent, or Firm* — Lee, Hong, Degerman, Kang & Waimey

(57) ABSTRACT

A method and an apparatus for triggering uplink data in a wireless LAN are disclosed. A method for receiving uplink data in a wireless LAN may comprise: a step in which an access point (AP) transmits a trigger frame for random connection; and a step in which the AP receives at least one buffer status report frame from at least one STA on a random connection transmission opportunity (TXOP) which is set on the basis of the trigger frame for random connection, wherein the random connection TXOP is allocated for a channel access attempt for transmitting the buffer status report frame of each of a plurality of non-specific STAs, and each of the at least one STA may be an STA which succeeds in the channel access among the plurality of non-specific STAs.

6 Claims, 11 Drawing Sheets

Related U.S. Application Data continuation of application No. 15/505,607, filed as application No. PCT/KR2015/008763 on Aug. 21, 2015, now Pat. No. 9,942,943.

(60) Provisional application No. 62/042,265, filed on Aug. 27, 2014, provisional application No. 62/039,926, filed on Aug. 21, 2014.

(51) Int. Cl.
| | |
|---|---|
| *H04L 12/801* | (2013.01) |
| *H04W 72/04* | (2009.01) |
| *H04W 74/00* | (2009.01) |
| *H04W 74/08* | (2009.01) |
| *H04W 88/10* | (2009.01) |

(52) U.S. Cl.
CPC ... *H04W 28/0278* (2013.01); *H04W 72/0413* (2013.01); *H04W 74/004* (2013.01); *H04W 74/0866* (2013.01); *H04W 88/10* (2013.01); *H04L 47/12* (2013.01); *H04W 74/085* (2013.01)

(58) Field of Classification Search
CPC .............. H04W 74/0866; H04W 88/10; H04W 74/085; H04L 47/10; H04L 47/12
See application file for complete search history.

(56) References Cited

U.S. PATENT DOCUMENTS

| | | |
|---|---|---|
| 2012/0120944 A1 | 5/2012 | Yang et al. |
| 2013/0235720 A1 | 9/2013 | Wang et al. |
| 2013/0287043 A1 | 10/2013 | Nanda et al. |
| 2014/0112194 A1 | 4/2014 | Novlan et al. |
| 2014/0204858 A1 | 7/2014 | Gong et al. |
| 2016/0088602 A1 | 3/2016 | Seok |
| 2016/0143010 A1 | 5/2016 | Kenney et al. |
| 2016/0262173 A1 | 9/2016 | Josiam et al. |
| 2016/0345349 A1 | 11/2016 | Ferdowsi et al. |
| 2017/0273140 A1 | 9/2017 | Ryu et al. |
| 2017/0289933 A1 | 10/2017 | Segev et al. |
| 2018/0213596 A1 | 7/2018 | Ryu et al. |
| 2018/0310338 A1* | 10/2018 | Li ........................ H04L 5/0094 |

FOREIGN PATENT DOCUMENTS

| | | |
|---|---|---|
| WO | 2013/055117 | 4/2013 |
| WO | 2013/191439 | 12/2013 |
| WO | 2014/107031 | 7/2014 |

OTHER PUBLICATIONS

PCT International Application No. PCT/KR2015/008763, International Search Report dated Nov. 30, 2017, 4 pages.

Institute of Electrical and Electronics Engineers, Inc., "Part 11: Wireless LAN Medium Access Control (MAC) and Physical Layer (PHY) Specifications," IEEE Draft P802.11-REVmb™/D12, 8.3.3.2, Nov. 2011, 6 pgs.

Institute of Electrical and Electronics Engineers, Inc., "Part 11: Wireless LAN Medium Access Control (MAC) and Physical Layer (PHY) Specifications," IEEE Draft P802.11-REVmb™/D12, 8.3.3.5-8.3.3.6, Nov. 2011, 3 pgs.

Institute of Electrical and Electronics Engineers, Inc., "Part 11: Wireless LAN Medium Access Control (MAC) and Physical Layer (PHY) Specifications," IEEE Draft P802.11-REVmb™/D12, 8.3.3.9, Nov. 2011, 3 pgs.

Institute of Electrical and Electronics Engineers, Inc., "Part 11: Wireless LAN Medium Access Control (MAC) and Physical Layer (PHY) Specifications," IEEE Draft P802.11-REVmb™/D12, 8.5.8.3, Nov. 2011, 3 pgs.

Institute of Electrical and Electronics Engineers, Inc., "Part 11: Wireless LAN Medium Access Control (MAC) and Physical Layer (PHY) Specifications," IEEE Draft P802.11-REVmb™/D12, 8.3.3.10, Nov. 2011, 5 pgs.

Institute of Electrical and Electronics Engineers, Inc., "Part 11: Wireless LAN Medium Access Control (MAC) and Physical Layer (PHY) Specifications," IEEE Draft P802.11-REVmb™/D12, 8.3.3.11, Nov. 2011, 3 pgs.

United States Patent and Trademark Office U.S. Appl. No. 15/925,663, Office Action dated Jul. 2, 2018, 19 pages.

United States Patent and Trademark Office U.S. Appl. No. 15/505,607, Notice of Allowance dated Dec. 4, 2017, 13 pages.

United States Patent and Trademark Office U.S. Appl. No. 15/505,607, Supplemental Notice of Allowability dated Dec. 20, 2017, 10 pages.

* cited by examiner

FIG. 1
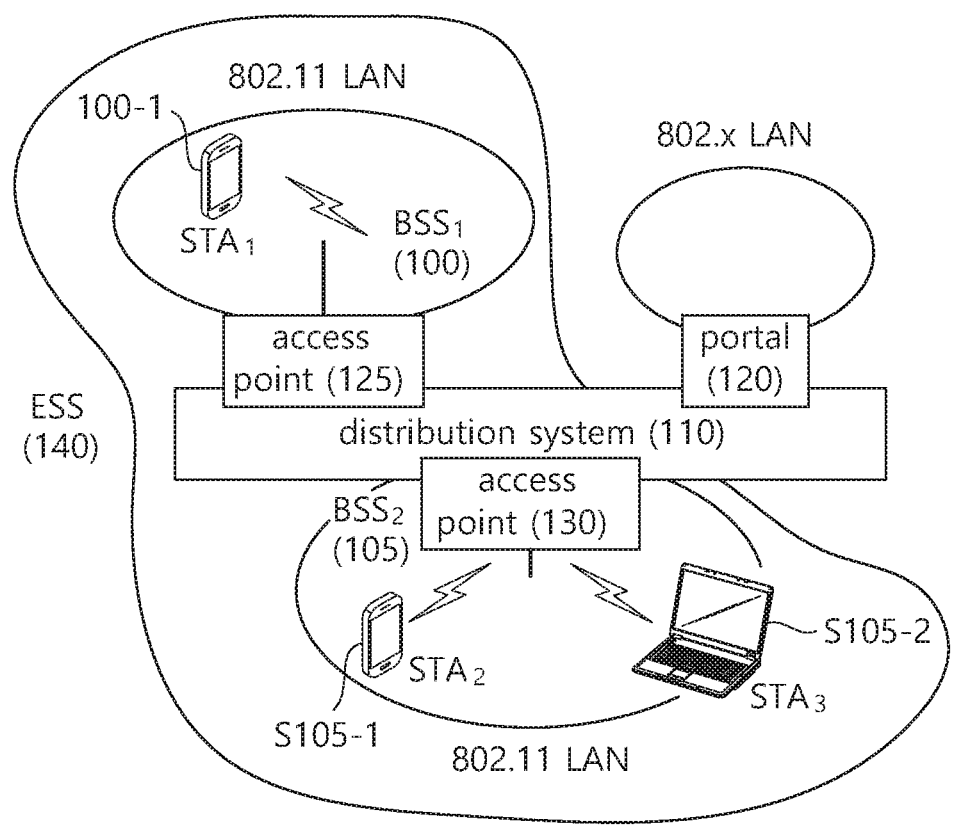
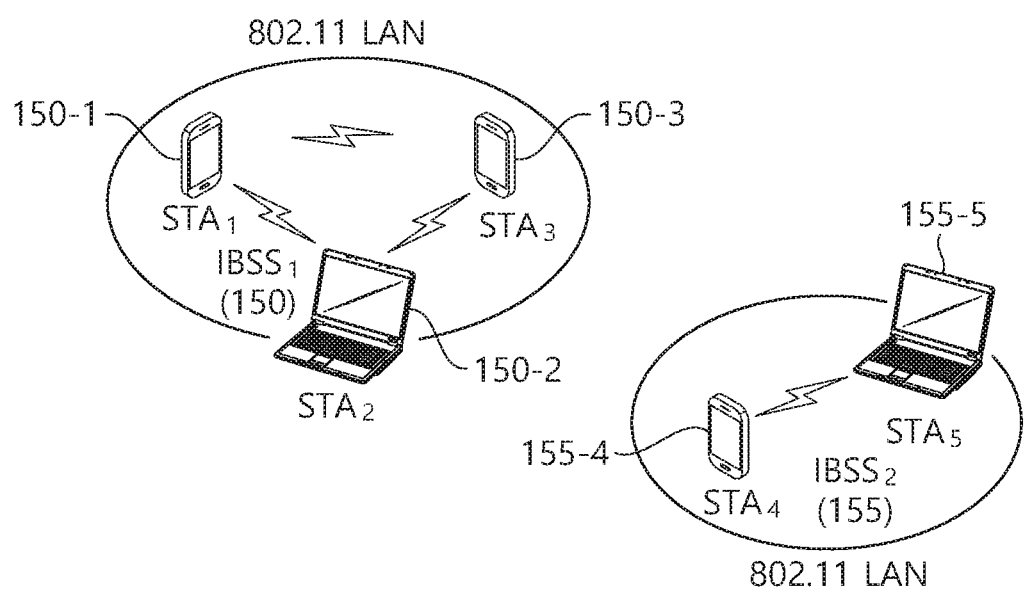

METHOD AND APPARATUS FOR TRIGGERING UPLINK DATA IN WIRELESS LAN

CROSS-REFERENCE TO RELATED APPLICATIONS

This application is a continuation of U.S. patent application Ser. No. 15/925,663, filed on Mar. 19, 2018, now U.S. Pat. No. 10,271,377, which is a continuation of U.S. patent application Ser. No. 15/505,607, filed on Feb. 21, 2017, now U.S. Pat. No. 9,942,943, which is the National Stage filing under 35 U.S.C. 371 of International Application No. PCT/KR2015/008763, filed on Aug. 21, 2015, which claims the benefit of U.S. Provisional Application Nos. 62/039,926, filed on Aug. 21, 2014, and 62/042,265, filed on Aug. 27, 2014, the contents of which are all hereby incorporated by reference herein in their entireties.

BACKGROUND OF THE INVENTION

Field of the Invention

The present invention relates to wireless communication, and more particularly, to a method and apparatus for triggering uplink data in a wireless local area network (WLAN).

Related Art

Discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments such as an environment in which an interference source exists, a dense heterogeneous network environment, and an environment in which a high user load exists, and the like.

An environment which is primarily considered in the next-generation WLAN is a dense environment in which access points (APs) and stations (STAs) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

In detail, scenarios such as wireless office, smart home, stadium, Hotspot, and building/apartment are largely concerned in the next-generation WLAN and discussion about improvement of system performance in a dense environment in which the APs and the STAs are a lot is performed based on the corresponding scenarios.

In the next-generation WLAN, improvement of system performance in an overlapping basic service set (OBSS) environment and improvement of outdoor environment performance, and cellular offloading are anticipated to be actively discussed rather than improvement of single link performance in one basic service set (BSS). Directionality of the next-generation means that the next-generation WLAN gradually has a technical scope similar to mobile communication. When a situation is considered, in which the mobile communication and the WLAN technology have been discussed in a small cell and a direct-to-direct (D2D) communication area in recent years, technical and business convergence of the next-generation WLAN and the mobile communication is predicted to be further active.

SUMMARY OF THE INVENTION

The present invention provides a method of triggering uplink data in a wireless local area network (WLAN).

The present invention also provides an apparatus for performing a method of triggering uplink data in a WLAN.

To achieve the aforementioned purpose of the present invention, one aspect of the present invention may provide a method of receiving uplink data in a WLAN. The method may include transmitting, by an access point (AP), a trigger frame for random access, and receiving, by the AP, at least one buffer status report frame from at least one station (STA) on a random access transmission opportunity (TXOP) configured based on the trigger frame for random access. The random access TXOP may be allocated to attempt channel access for transmission of the buffer status report frame of each of a plurality of unspecific STAs. Each of the at least one STA may be an STA which has succeeded in the channel access among the plurality of unspecific STAs.

To achieve the aforementioned purpose of the present invention, another aspect of the present invention may provide an AP for receiving uplink data in a WLAN. The AP may include a radio frequency (RF) unit configured to transmit or receive a radio signal, and a processor operatively coupled to the RF unit. The processor may be configured to transmit a trigger frame for random access, and receive at least one buffer status report frame from at least one STA on a random access TXOP configured based on the trigger frame for random access. The random access TXOP may be allocated to attempt channel access for transmission of the buffer status report frame of each of a plurality of unspecific STAs. Each of the at least one STA may be an STA which has succeeded in the channel access among the plurality of unspecific STAs.

Uplink (UL) multi-user (MU) transmission may be supported on the basis of triggering of uplink data of an access point (AP). Therefore, an efficiency and throughput of a wireless local area network (WLAN) can be improved.

BRIEF DESCRIPTION OF THE DRAWINGS

FIG. 1 is a conceptual view illustrating a structure of a wireless local area network (WLAN).

DESCRIPTION OF EXEMPLARY EMBODIMENTS

Figure 2:
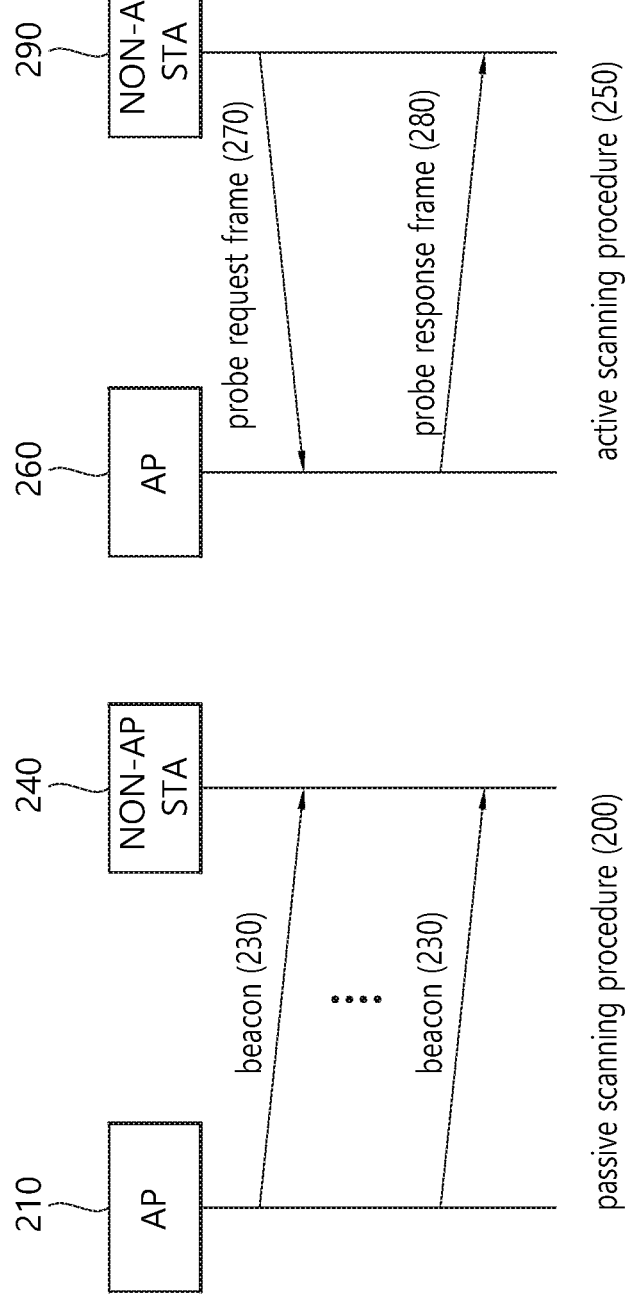
FIG. 2 is a conceptual view illustrating a scanning method in a WLAN.

FIG. 1 is a conceptual view illustrating the structure of a wireless local area network (WLAN).

An upper part of FIG. 1 shows the structure of the institute of electrical and electronic engineers (IEEE) 802.11 infrastructure network.

Referring to the upper part of FIG. 1, the WLAN system may include one or more basic service sets (BSSs) 100 and 105. The BSS 100 or 105 is a set of an access point (AP) such as AP 125 and a station (STA) such as STA1 100-1 that may successfully sync with each other to communicate with each other and is not the concept to indicate a particular area. The BSS 105 may include one AP 130 and one or more STAs 105-1 and 105-2 connectable to the AP 130.

The infrastructure BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 130 connected via the distribution system 110. The APs included in one ESS 140 may have the same service set identification (SSID).

The portal 120 may function as a bridge that performs connection of the WLAN network (IEEE 802.11) with other network (for example, 802.X).

In the infrastructure network as shown in the upper part of FIG. 1, a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent basic service set (BSS).

A lower part of FIG. 1 is a concept view illustrating an independent BSS.

Referring to the lower part of FIG. 1, the independent BSS (IBSS) is a BSS operating in ad-hoc mode. The IBSS does not include an AP, so that it lacks a centralized management entity. In other words, in the IBSS, the STAs 150-1, 150-2, 150-3, 155-4 and 155-5 are managed in a distributed manner. In the IBSS, all of the STAs 150-1, 150-2, 150-3, 155-4 and 155-5 may be mobile STAs, and access to the distribution system is not allowed so that the IBSS forms a self-contained network.

The STA is some functional medium that includes a medium access control (MAC) following the Institute of Electrical and Electronics Engineers (IEEE) 802.11 standards and that includes a physical layer interface for radio media, and the term "STA" may, in its definition, include both an AP and a non-AP station (STA).

The STA may be referred to by various terms such as mobile terminal, wireless device, wireless transmit/receive unit (WTRU), user equipment (UE), mobile station (MS), mobile subscriber unit, or simply referred to as a user.

Hereinafter, in an embodiment of the present invention, data (or a frame) to be transmitted from the AP to the STA may be expressed by the term 'downlink data (or a downlink frame)', and data (or a frame) to be transmitted from the STA to the AP may be expressed by the term 'uplink data (or an uplink frame)'. In addition, transmission from the AP to the STA may be expressed by the term 'downlink transmission', and transmission from the STA to the AP may be expressed by the term 'uplink transmission'.

Further, a physical layer (PHY) protocol data unit (PPDU), frame, and data transmitted through downlink transmission may be expressed respectively by the term "downlink PPDU", "downlink frame", and "downlink data". The PPDU may be a data unit including a PPDU header and a physical layer service data unit (PSDU) (or a MAC protocol data unit (MPDU)). The PPDU header may include a PHY header and a PHY preamble, and the PSDU (or MPDU) may include a frame (or an information unit of a MAC layer) or may be a data unit indicating the frame. The PHY header may be expressed by the term "physical layer convergence protocol (PLCP) header", and the PHY preamble may be expressed by the term "PLCP preamble".

Further, a PPDU, frame, and data transmitted through uplink transmission may be expressed respectively by the term "uplink PPDU", "uplink frame", and "uplink data".

In the conventional WLAN system, a full bandwidth is used for downlink transmission to one STA and uplink transmission to one STA on the basis of single (SU)-orthogonal frequency division multiplexing (OFDM) transmission. Further, in the conventional WLAN system, an AP may perform downlink (DL) multi-user (MU) transmission on the basis of MU multiple input multiple output (MIMO), and such transmission may be expressed by the term "DL MU MIMO transmission".

In a WLAN system according to an embodiment of the present invention, a transmission method based on orthogonal frequency division multiple access (OFDMA) may be supported for uplink transmission and downlink transmission. More specifically, in the WLAN system according to the embodiment of the present invention, an AP may perform DL MU transmission based on OFDMA, and such transmission may be expressed by the term "DL MU OFDMA transmission". When the DL MU OFDMA transmission is performed, the AP may transmit downlink data (or downlink frame, downlink frame PPDU) to each of a plurality of STAs on overlapping time resources through a plurality of frequency resources (a plurality of subbands (or subchannels)). The DL MU OFDMA transmission may be used together with the DL MU MIMO transmission. For example, DL MU-MIMO transmission based on a plurality of space-time streams (or spatial streams) may be performed on a specific subband (or subchannel) allocated for the DL MU OFDMA transmission.

Further, in the WLAN system according to the embodiment of the present invention, uplink (UL) multi-user (MU) transmission may be supported so that the plurality of STAs transmit data to the AP on the same time resource. Uplink transmission on an overlapping time resource may be performed by each of the plurality of STAs on a frequency domain or a spatial domain.

When the uplink transmission is performed by each of the plurality of STAs on the frequency domain, a different frequency resource (subband, subchannel, or resource unit (RU)) may be allocated for each of the plurality of STAs as an uplink transmission resource. Each of the plurality of STAs may transmit uplink data to the AP through the allocated different frequency resource. A transmission method through the different frequency resource may be expressed by the term "UL MU OFDMA transmission method".

When the uplink transmission is performed by each of the plurality of STAs on the spatial domain, a different space-time stream (or spatial stream) may be allocated to each of the plurality of STAs, and each of the plurality of STAs may transmit uplink data to the AP through the different space-time stream. A transmission method through the different spatial stream may be expressed by the term "UL MU MIMO transmission method".

UL MU OFDMA transmission and UL MU MIMO transmission may be performed together. For example, UL MU MIMO transmission based on a plurality of space-time streams (or spatial streams) may be performed on a specific subband (or subchannel) allocated for UL MU OFDMA transmission.

The UL MU transmission may be performed by using triggering of the AP. The AP needs to pre-acquire information on pending (or buffered) uplink data in an associated STA to trigger UL MU transmission of the plurality of STAs. Further, the AP may also determine whether to trigger UL MU transmission by considering a state of a BSS load to improve WLAN efficiency.

FIG. 2 is a conceptual view illustrating a scanning method in a wireless LAN.

Referring to FIG. 2, the scanning method may be divided into passive scanning 200 and active scanning 250.

Referring to the left side of FIG. 2, passive scanning 200 may be performed by a beacon frame 230, which is periodically broadcasted by an AP 210. The AP 210 of the wireless LAN broadcasts a beacon frame 230 to a non-AP STA 240 at each specific interval (e.g., 100 msec). Information on the current network may be included in the beacon frame 230. By receiving the beacon frame 230 that is periodically broadcasted, the non-AP STA 240 receives the network information and may perform scanning on the AP 240, which will be performing the authentication/association procedure, and the channel.

The passive scanning method 200 may be performed by simply receiving the beacon frame 230 that is being transmitted from the AP 210 without requiring the non-AP STA 240 to transmit any frames. Therefore, the passive scanning 200 is advantageous in that the overall overhead, which occurs due to the transmission/reception of data within the network, is small. However, since the scanning process can only be performed manually in proportion to the cycle of the beacon frame 230, passive scanning 200 is disadvantageous in that the time consumed for performing the scanning process is relatively longer in comparison with the active scanning method. Detailed description on the beacon frame is disclosed in 8.3.3.2 beacon frame of the IEEE Draft P802.11-REVmb™/D12, November 2011 'IEEE Standard for Information Technology Telecommunications and information exchange between systems—Local and metropolitan area networks—Specific requirements Part 11: Wireless LAN Medium Access Control (MAC) and Physical Layer (PHY) Specifications (hereinafter referred to as IEEE 802.11)', which was disclosed in November 2011. In IEEE 802.11 ai, a beacon frame of another format may be additionally used, and such beacon frame may be referred to as a fast initial link setup (FILS) beacon frame. Additionally, a measurement pilot frame may be used in the scanning procedure as a frame including only a portion of the information of the beacon frame. The measurement pilot frame is disclosed in the IEEE 802.11 8.5.8.3 measurement pilot format.

Referring to the right side of FIG. 2, in active scanning 250, a non-AP STA 290 may transmit a probe request frame 270 to an AP 260, thereby being capable of actively performing a scanning procedure.

After receiving the probe request frame 270 from the non-AP STA 290, the AP 260 waits for a random period of time in order to prevent frame collision. And, then, the AP 260 may include network information to a probe response frame 280 and may transmit the probe response frame 280 to the non-AP STA 290. The non-AP STA 290 may obtain the network information based on the received probe response frame 280 and may then stop the scanning procedure.

In case of active scanning 250, since the non-AP STA 290 actively performs scanning, it is advantageous in that the time consumed for performing the scanning procedure is short. However, since the non-AP STA 290 is required to transmit the probe request frame 270, it is disadvantageous in that the network overhead increases for the transmission and reception of the frames. The probe request frame 270 is disclosed in IEEE 802.11 8.3.3.9, and the probe response frame 280 is disclosed in IEEE 802.11 8.3.3.10.

Once the scanning is completed, the AP and the non-AP STA may perform the authentication and association procedures.

Figure 3:
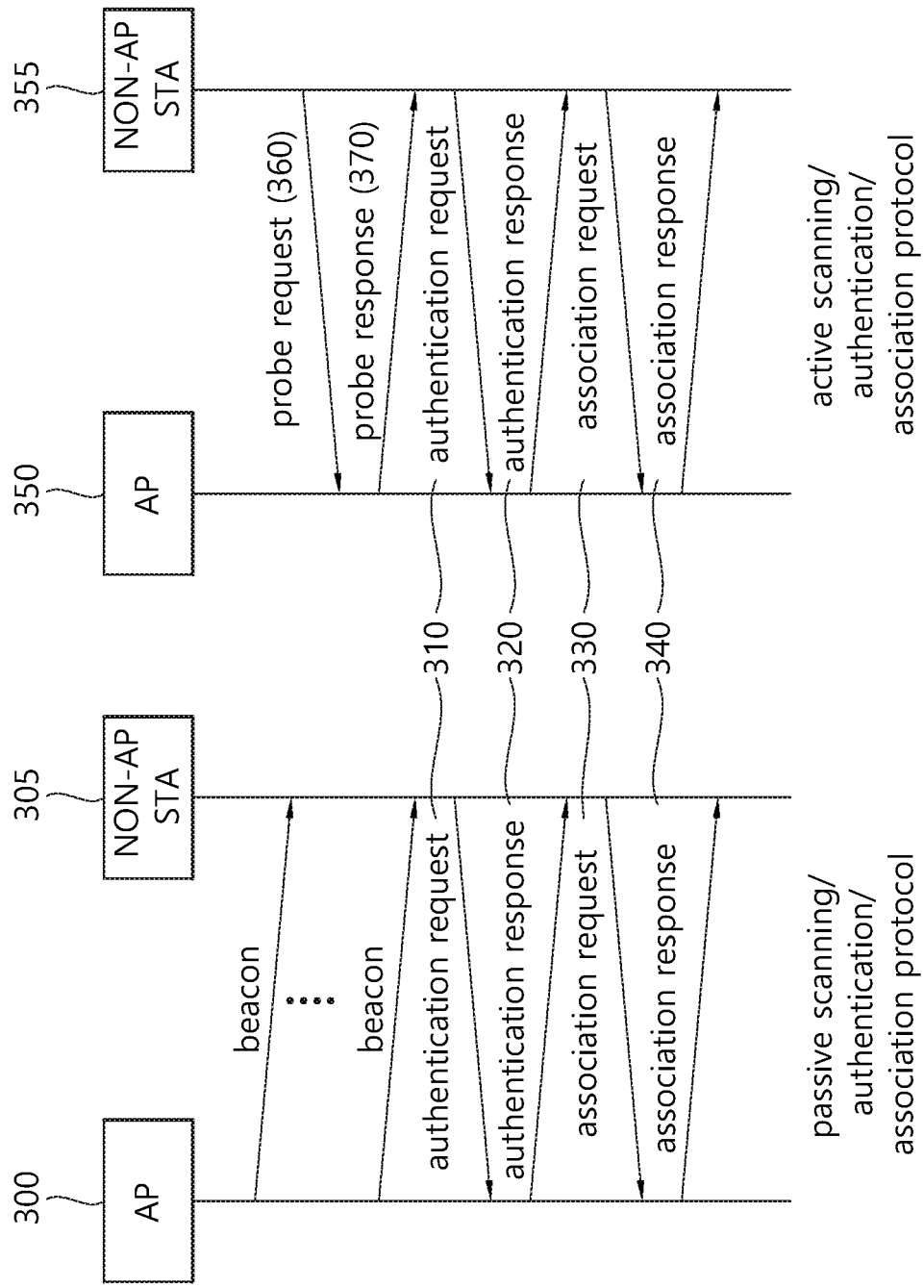
FIG. 3 is a conceptual view illustrating an authentication procedure and an association procedure being performed after a scanning procedure of an access point (AP) and a station (STA).

FIG. 3 is a conceptual view illustrating an authentication procedure and an association procedure being performed after the scanning procedure of the AP and the STA.

Referring to FIG. 3, after performing the passive/active scanning procedure, the authentication procedure and the association procedure may be performed with one of the scanned APs.

The authentication and association procedures may be performed, for example, through 2-way handshaking. The left side of FIG. 3 is a conceptual view showing the authentication and association procedures after performing passive scanning, and the right side of FIG. 3 is a conceptual view showing the authentication and association procedures after performing scanning.

Regardless of whether the active scanning method or the passive scanning method has been used, the authentication procedure and the association procedure may be equally performed by exchanging an authentication request frame 310/authentication response frame 320 and an association request frame 330/association response frame 340 between the AP 300 and 350 and the non-AP STA 305 and 355.

During the authentication procedure, the non-AP STA 305 and 355 may transmit an authentication request frame 310 to the AP 300 and 350. As a response to the authentication request frame 310, the AP 300 and 350 may transmit an authentication response frame 320 to the non-AP STA 305 and 355. Detailed description on the authentication frame format is disclosed in IEEE 802.11 8.3.3.11.

During the association procedure, the non-AP STA 305 and 355 may transmit an association request frame 330 to the AP 300 and 350. And, as a response to the association request frame 330, the AP 300 and 350 may transmit an association response frame 340 to the non-AP STA 305 and 355. Information related to the ability of the non-AP STA 305 and 355 is included in the association request frame 330, which is transmitted to the AP. Based on the capability information of the non-AP STA 305 and 355, the AP 300 and 350 may determine whether or not the non-AP STA 305 and 355 can be supported. In case the non-AP STA 305 and 355 can be supported, the AP 300 and 350 may transmit the association response frame 340 to the non-AP STA 305 and 355. The association response frame 340 may include information on whether or not the association request frame 330 is accepted and the corresponding reason and capability information of the non-AP STA that can be supported by the corresponding AP. Detailed description on the association frame format is disclosed in IEEE 802.11 8.3.3.5/8.3.3.6.

After the association procedure is carried out between the AP and the non-AP STA, normal transmission and reception of data may be performed between the AP and the non-AP STA. In case the association procedure between the AP and the non-AP STA has failed, based on the reason why the association procedure has failed, the association procedure may be performed once again with the same AP, or a new association procedure may be performed with another AP.

In case the STA is associated with the AP, the STA may be allocated with an association ID (association identifier, AID) from the AP. The AID that is allocated to the STA may correspond to a unique value within one BSS, and the current AID value may correspond to any one of the values within the range of 1~2007. Since 14 bits are allocated for the AID, although a maximum of 16383 bits may be used for the AID value, values within the range of 2008~16383 are reserved.

Figure 4:
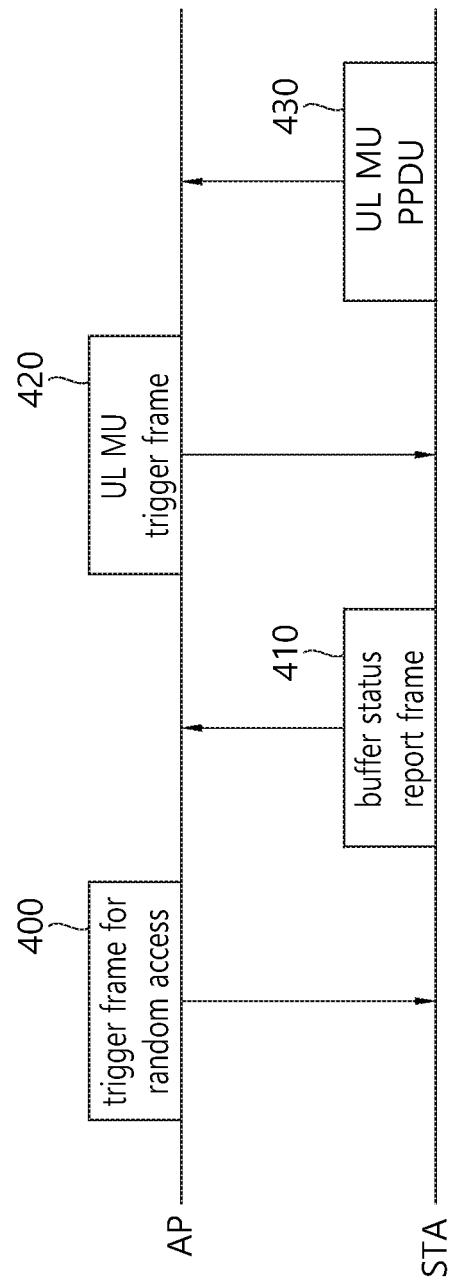
FIG. 4 is a conceptual view illustrating an uplink (UL) multi-user (MU) transmission method according to an embodiment of the present invention.

FIG. 4 is a conceptual view illustrating a UL MU transmission method according to an embodiment of the present invention.

In FIG. 4, a preliminary procedure for UL MU transmission of a plurality of STAs is disclosed.

Referring to FIG. 4, when an initial access procedure (e.g., a scanning procedure, an authentication procedure, an association procedure) of an STA is performed, an AP and the STA may negotiate UL MU transmission capability. For example, the STA may transmit information regarding whether UL MU transmission is possible to the AP through an initial access frame (e.g., an association request frame) used in the initial access procedure. The AP may transmit information regarding whether to support UL MU transmission through a response frame (e.g., an association response frame) in response to the initial access frame transmitted by the STA. If whether to support the UL MU transmission is confirmed between the STA and the AP, the STA may be triggered by a trigger frame of the AP to transmit uplink data to the AP on the basis of the UL MU transmission.

The AP determines whether to trigger the UL MU transmission.

The AP may determine whether to trigger the UL MU transmission by considering a state of a BSS load, information on the number of STAs supporting UL MU transmission, or the like. For example, if the BSS load is heavy, or if the number of STAs supporting the UL MU transmission is greater than or equal to a threshold number, the AP may trigger the UL MU transmission.

If it is determined to trigger the UL MU transmission, the AP may collect the buffer status information of the STA.

The AP may transmit a trigger frame 400 for random access to trigger transmission of buffer information of the STA. The trigger frame 400 for random access may be transmitted on a broadcast basis. The trigger frame 400 for random access may also be expressed by the term "buffer status trigger frame".

The AP may transmit information for restricting (or determining) an STA for transmitting buffer status information on the basis of the buffer status trigger frame 400 through another frame transmitted prior to the trigger frame 400 for random access or through the trigger frame 400 for random access. The information for restricting (or determining) the STA for transmitting the buffer status information on the basis of the trigger frame 400 for random access may be expressed by the term "buffer status report STA determination information". The buffer status report STA determination information will be described at a later time.

The STA may receive the trigger frame 400 for random access and transmit a buffer status report frame 410 in response to the trigger frame 400 for random access on a transmission opportunity (TXOP) acquired by the trigger frame 400 for random access. The buffer status report frame 410 may include buffer status information (or information on pending (or buffered) uplink data) of the STA. For example, the buffer status information may include a size of the pending uplink data, an access category of the pending uplink data, a backoff count, or the like. The buffer status report frame 410 may be transmitted only by an STA which satisfies a condition configured based on the buffer status report STA determination information transmitted by the AP.

Alternatively, according to the embodiment of the present invention, when UL MU transmission is limitedly enabled in a BSS of the AP and/or when whether to enable it is determined, the buffer status report frame 410 may be transmitted by an STA which does not satisfy the condition configured based on the buffer status report STA determination information. Further, when UL MU transmission is disabled in the BSS of the AP, the buffer status report frame 410 may not be transmitted by the STA which satisfies the buffer status report STA determination information. This will be described in detail at a later time.

Although the buffer status information of the STA may be transmitted through an independent frame (or stand-alone frame) such as the buffer status report frame 410, the STA may also transmit the buffer status information in a piggyback manner. For example, the STA may transmit the buffer status information by piggybacking on the existing data frame, control frame, or management frame transmitted on an uplink. The STA may transmit the piggybacked uplink frame in response to the trigger frame 400 for random access or transmit the buffer status information in a piggyback manner without having to use triggering based on the separate trigger frame 400 for random access.

In this manner, the AP may acquire the buffer status information of each of the plurality of STAs.

The AP may trigger UL MU transmission on the basis of the acquired buffer status information of each of the plurality of STAs. The AP may transmit a UL MU trigger frame 420 for triggering UL MU transmission to a plurality of target STAs which will perform UL MU transmission.

The UL MU trigger frame 420 may include information on a plurality of target STAs which will perform UL MU transmission, information on uplink resources for transmission of uplink data of each of the plurality of target STAs, information on a TXOP for transmission of uplink data of each of the plurality of target STAs, information on transmission timing of uplink data of each of the plurality of target STAs, or the like.

More specifically, the information on the plurality of target STAs which will perform UL MU transmission may include information on an association identifier (AID) of each of the plurality of target STAs. Further, the information on the uplink resource for transmission of uplink data of each of the plurality of target STAs may include information on a subchannel (or subband, RU) allocated to each of the plurality of target STAs and/or information on a space-time stream allocated to each of the plurality of target STAs.

Each of the plurality of target STAs may receive the UL MU trigger frame 420, and may transmit uplink data through a UL MU PPDU 430 to the AP through an uplink frame during a TXOP duration by using the allocated uplink resource.

Figure 5:
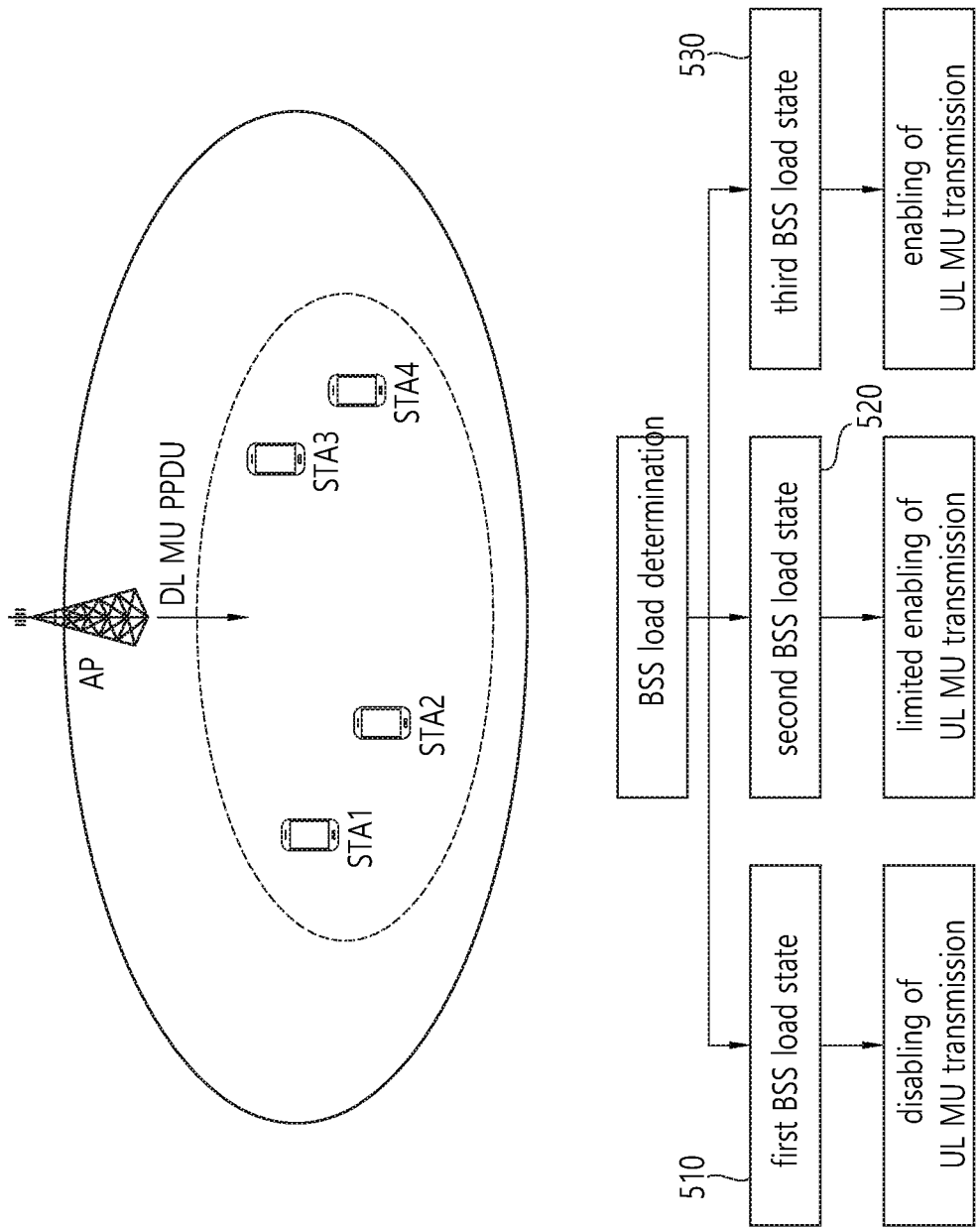
FIG. 5 is a conceptual view illustrating a UL MU transmission procedure according to an embodiment of the present invention.

FIG. 5 is a conceptual view illustrating a UL MU transmission procedure according to an embodiment of the present invention.

In FIG. 5, a method of enabling/disabling UL MU transmission of an AP is disclosed.

Referring to FIG. 5, the AP may determine whether to enable UL MU transmission in a BSS. Even if the UL MU transmission is supported by the AP and an STA, the AP may determine whether to enable the UL MU transmission in the BSS.

Information on whether to enable the UL MU transmission in the BSS may be defined as N bits (where N is a natural number) and may be transmitted through a downlink frame (e.g., a beacon frame as a downlink management frame) or transmitted by being piggybacked on a medium access control (MAC) header of the downlink frame. The N bits indicating whether to enable the UL MU transmission in the BSS may be expressed by the term "UL MU transmission enabling information (or UL MU operation mode information)". For example, the N-bit UL MU transmission enabling information (or UL MU operation mode information) may indicate one of disabling/limited enabling/enabling of the UL MU transmission. The UL MU transmission enabling information (or UL MU operation mode information) may be transmitted in a broadcast manner through a frame such as a beacon frame, or may be transmitted in a unicast manner through a frame such as a piggybacked unicast downlink frame.

For example, the AP may decide a BSS load to determine whether to enable the UL MU transmission. A BSS load state may be classified by the AP into one of a light BSS load state (or a first BSS load state), a medium BSS load state (or a second BSS load state), and a heavy BSS load state (or a third BSS load state). The aforementioned BSS load state may be determined by considering the number of STAs associated with the BSS, channel utilization calculated based on a time in which a channel is in a busy state, utilization of a spatial stream (or a space-time stream), or the like.

More specifically, if the AP determines that the BSS load state is the light BSS load state (or a first load state 510), the AP may disable UL MU transmission. The AP may transmit UL MU transmission enabling information indicating the disabling of the UL MU transmission. In this case, an STA included in a BSS may transmit uplink data to the AP on the basis of UL SU transmission instead of the UL MU transmission.

If the AP determines that the BSS load state is the medium BSS load state (or a second load state 520), the AP may enable the UL MU transmission in such a manner that the UL MU transmission is triggered only when a certain condition is satisfied. In other words, if the AP determines that the BSS load state is the medium BSS load state (or the second load state 520), the AP may limitedly allow UL MU transmission. The AP may transmit the UL MU transmission enabling information indicating the limited enabling of the UL MU transmission to the STA included in the BSS.

Only an STA which satisfies a condition configured based on buffer status report STA determination information may transmit buffer status information to the AP, and may perform UL MU transmission. For example, if pending data is uplink data of an access category having a backoff count greater (or smaller) than a backoff count threshold which is set based on the buffer status report STA determination information, the STA may transmit the buffer status information to the AP. In this case, an STA capable of transmitting the buffer status information in the BSS may be limited, and a target STA which will perform UL MU transmission may be limited.

Alternatively, a target STA capable of performing UL MU transmission may be limited by allowing the buffer status information to be transmitted only in a piggyback manner. That is, by collecting buffer status information of the STA only in a piggyback manner other than triggering (polling) based on a random access trigger frame transmitted by the AP, the STA capable of transmitting the buffer status information in the BSS may be limited, and the target STA which will perform the UL MU transmission may be limited.

An STA of which UL MU transmission is not triggered may perform UL SU transmission. For example, if the buffer status information is not transmitted and thus the UL MU transmission is not triggered by the AP, the STA may acquire a medium through channel access based on enhanced distributed channel access (EDCA) and transmit an uplink frame to the AP.

If the AP determines that the BSS load state is the heavy BSS load state (or a third load state 530), the AP may trigger transmission of uplink data based on the UL MU transmission.

The AP may transmit UL MU transmission enabling information indicating the enabling of the UL MU transmission to the STA included in the BSS. In this case, the STA may transmit uplink data to the AP through the UL MU transmission based on the trigger of the AP.

When the STA receives the UL MU transmission enabling information indicating the enabling of the UL MU transmission, the STA may transmit the buffer status information to the AP without consideration of a condition configured based on the buffer status report STA determination information. That is, the STA capable of transmitting the buffer status information in the BSS is not limited, and the target STA which will perform the UL MU transmission is not limited.

For example, the STA may transmit the buffer status information to the AP by not considering a backoff count threshold which is set based on the buffer status report STA determination information or by setting the backoff count threshold to 0 or 1. The buffer status information may be transmitted by the STA by using both of a piggyback scheme and/or a triggering (or polling) scheme based on the trigger frame for random access.

Even if the AP determines that the BSS load state is the heavy BSS load state (or a third load state 530), UL SU transmission may also be performed. Even if the AP enables the UL transmission, the UL SU transmission may also be performed under the following limited condition.

A buffer status report frame for transmission of buffer status information may be triggered (or polled) by the trigger frame for random access and may be transmitted by the STA on the basis of the UL SU transmission.

Further, the STA may transmit buffer status information even if the buffer status report frame is not triggered by the transmission of the trigger frame for random access. A report of the buffer status information is expressed by the term "unsolicited buffer status report", and the buffer status information transmitted based on the unsolicited buffer status report is expressed by the term "unsolicited buffer status information"

The unsolicited buffer status information may be categorized into data corresponding to one access category (AC) among existing ACs and may be transmitted based on EDCA which uses existing AC parameters. Alternatively, the unsolicited buffer status information may be transmitted by using EDCA which uses a newly defined AC parameter by being defined as data corresponding to a new AC. The newly defined AC parameter may be set such that a new AC for the unsolicited buffer status information has a higher priority than other existing ACs (AC_BE (best effort), AC_BK (background), AC_VI (video), AC_VO (voice)).

The unsolicited buffer status information may be transmitted when a set specific timer expires The set specific timer is a timer for setting a time duration for transmission of a triggered buffer status report frame, and may be expressed by the term "max polling timer" or "max trigger timer". That is, the unsolicited buffer status report may be performed on a time resource except for a time resource for transmission of a buffer status report frame transmitted on a trigger basis.

Figure 7:
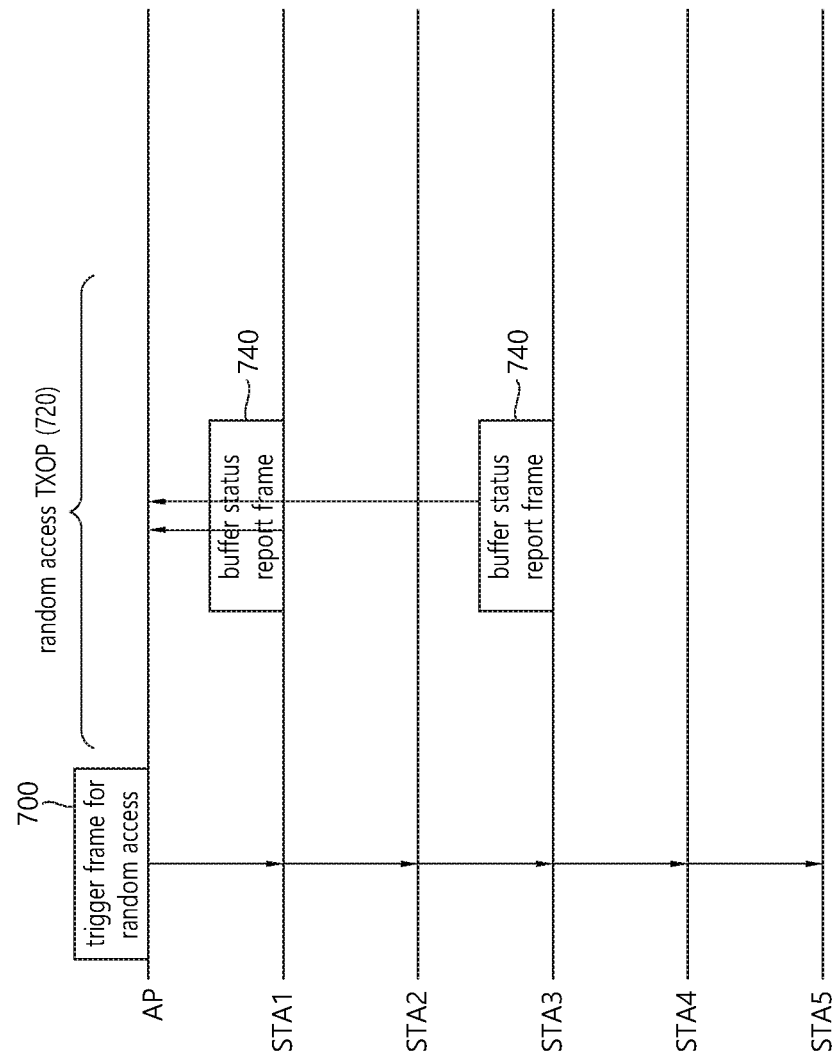
FIG. 7 is a conceptual view illustrating a method of triggering a buffer status report frame of an STA according to an embodiment of the present invention.

The UL MU transmission method for a case where the AP determines that the BSS load state is the heavy BSS load state (or the third load state) is additionally disclosed in FIG. 7.

Figure 6:
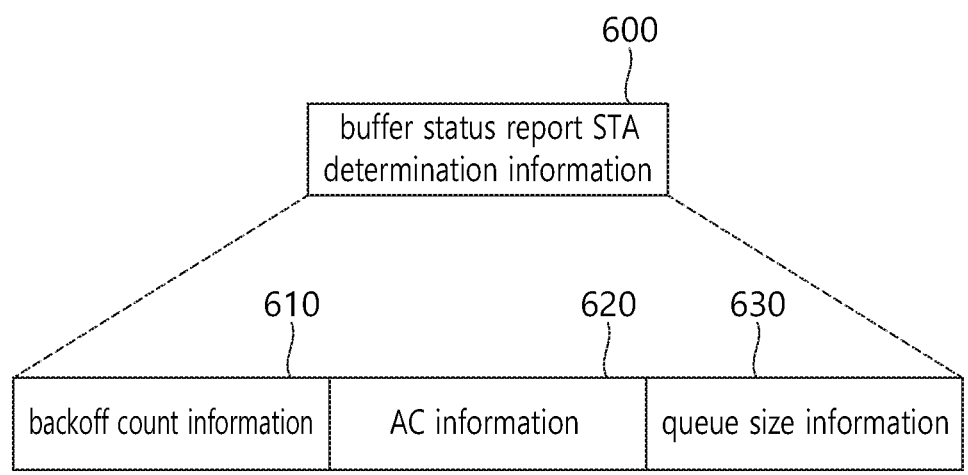
FIG. 6 is a conceptual view illustrating buffer status report STA determination information according to an embodiment of the present invention.

FIG. 6 is a conceptual view illustrating buffer status report STA determination information according to an embodiment of the present invention.

In FIG. 6, threshold information transmitted through buffer status report STA determination information 600 is disclosed. Whether to perform transmission of the buffer status report frame of the STA (or report of the buffer status information) may be determined based on the buffer status report STA determination information 600 transmitted by an AP. The buffer status report STA determination information 600 may be transmitted by the AP through a downlink frame (e.g., a beacon frame, an association response frame, a trigger frame for random access, etc.).

Referring to FIG. 6, the buffer status report STA determination information 600 may include at least one of back-off count information 610, AC information 620, and queue size information 630.

The backoff count information 610 may include information on a threshold of a backoff count for transmission of the buffer status report frame. The STA may have pending uplink data corresponding to each of a plurality of access categories, and a separate backoff count corresponding to each of the plurality of access categories may be set for transmission of the pending uplink data.

If a back-off count for transmission of buffered data corresponding to a specific access category is greater than the threshold of the back-off count set by the back-off count information 610, the STA may transmit buffer status information related to the specific access category to the AP through the buffer status report frame. If the backoff count for transmission of the buffered data corresponding to the specific access category is less than or equal to the threshold of the backoff count set by the backoff count information 610, the STA may not transmit the buffer status information related to the specific access category to the AP through the buffer status report frame.

According to another embodiment of the present invention, on the contrary, if the backoff count for transmission of the buffered data corresponding to the specific access category is less than or equal to the threshold of the backoff count set by the backoff count information 610, the STA may transmit the buffer status information related to the specific access category to the AP through the buffer status report frame. If the back-off count for transmission of the buffered data corresponding to the specific access category is greater than the threshold of the back-off count set by the back-off count information 610, the STA may not transmit the buffer status information related to the specific access category to the AP through the buffer status report frame.

The AC information 620 may include information on the access category to be reported by the STA. The AC information 620 may be used to request only buffer status information related to the specific access category among a plurality of access categories. For example, the AC information 620 may include four bits, and each of the four bits may indicate an access category for requesting the buffer status information to the STA. Among the four bits, a bit 1 may enable a report of buffer status information corresponding to AC_BE (best effort), a bit 2 may enable a report of buffer status information corresponding to AC_BK (background), a bit 3 may enable a report of buffer status information corresponding to AC_VI (video), and a bit 4 may enable a report of buffer status information corresponding to AC_VO (voice). The STA may transmit only the buffer status information related to the enabled access category based on AC information to the AP through the buffer status report frame.

The queue size information 630 may include information on a threshold size of uplink data for transmission of the buffer status information. The STA may determine whether there is uplink data having a queue size (or data size) greater than a threshold size set by the queue size information 630 among pending uplink data corresponding to each of the plurality of access categories of the STA. The STA may transmit only the buffer status information related to the access category corresponding to the uplink data having the queue size greater than the threshold size to the AP through the buffer status report frame.

According to another embodiment of the present invention, on the contrary, the STA may determine whether there is data having a queue size smaller than or equal to the threshold size set by the queue size information 630 among the buffered data corresponding to each of the plurality of access categories of the STA. The STA may transmit only the buffer status information related to the access category corresponding to data having the queue size smaller than or equal to the threshold size to the AP through the buffer status report frame.

In FIG. 4, it is assumed that the buffer status information is transmitted through the buffer status report frame when the threshold information transmitted through the buffer status report STA determination information 600 is satisfied. However, if the threshold information transmitted through the buffer status report STA determination information 600 is satisfied, the buffer status information may be transmitted through an uplink frame in which the buffer status information is piggybacked.

FIG. 7 is a conceptual view illustrating a method of triggering a buffer status report frame of an STA according to an embodiment of the present invention.

In FIG. 7, a UL MU transmission method is disclosed when an AP determines that a BSS load state is a heavy BSS load state (or a third load state).

Referring to FIG. 7, the AP may assign a TXOP for transmission of a buffer status report frame to a plurality of unspecific STAs other than a specific STA. The unspecific STA may be expressed by the term "anonymous STA".

The TXOP may be expressed by the term "random access TXOP" 720 or "broadcast TXOP" or "buffer status report TXOP". The AP may allocate a random access TXOP 700 for transmission of a buffer status report frame 740 of at least one unspecific STA. At least one unspecific STA may transmit the buffer status report frame 740 through the allocated random access TXOP 700. The TXOP may be a time resource and/or frequency resource allocated for transmission of data. The random access TXOP 700 may indicate a frequency resource/time resource for transmission of the buffer status report frame 740.

The AP may transmit information for allocation of the random access TXOP 720. The information for allocation of the random access TXOP 720 may include at least one of a start offset of the TXOP and information on the frequency resource/time resource to which the TXOP is allocated. Information for allocation of the random access TXOP 720 may be transmitted through a downlink management/control frame (e.g., a beacon frame, a broadcast clear to send (CTS) frame, a trigger frame, a new control frame, etc.) to be broadcast.

The unspecific STA may be allocated the random access TXOP 720 on the basis of information for allocation of the random access TXOP 720 and may transmit the buffer status report frame 740 through random access channel access.

That is, the AP may transmit a trigger frame for random access and receive at least one buffer status report frame from at least one STA on the random access TXOP 720 which is configured based on the trigger frame for random access. The random access TXOP 720 is allocated to attempt channel access for transmission of a buffer status report frame of each of the plurality of unspecific STAs, and each of the at least one STA may be an STA which has succeeded in the channel access among the plurality of unspecific STAs. More specifically, by considering information on the number of frequency resource units allocated for the random access TXOP 720, at least one STA may be determined based on a backoff procedure in the allocated frequency resource unit.

According to the embodiment of the present invention, the unspecific STA may transmit the buffer status report frame 740 during the random access TXOP 720 if the following condition is satisfied.

The unspecific STA may transmit the buffer status report frame 740 on the random access TXOP 720 if a time set by a specific timer such as a maximum poll timer expires.

Alternatively, a parameter (e.g., a contention window value for selecting a backoff count, etc.) used in the backoff procedure for transmission of the buffer status report frame through random access may be defined as a separate parameter unlike in a backoff parameter used in the existing data transmission. In this case, if the backoff count related to transmission of the buffer status report frame 740 becomes zero, the unspecific STA may transmit the buffer status report frame 740.

Alternatively, if the backoff count related to transmission of the buffered data is less than the threshold of the backoff count, the unspecific STA may transmit the buffer status report frame 740. On the contrary, if the backoff count related to transmission of the buffered data is greater than or equal to the threshold of the backoff count, the unspecific STA may transmit the buffer status report frame 740. The threshold of the backoff count may be set by backoff count information included in the buffer status report STA determination information.

Figure 8:
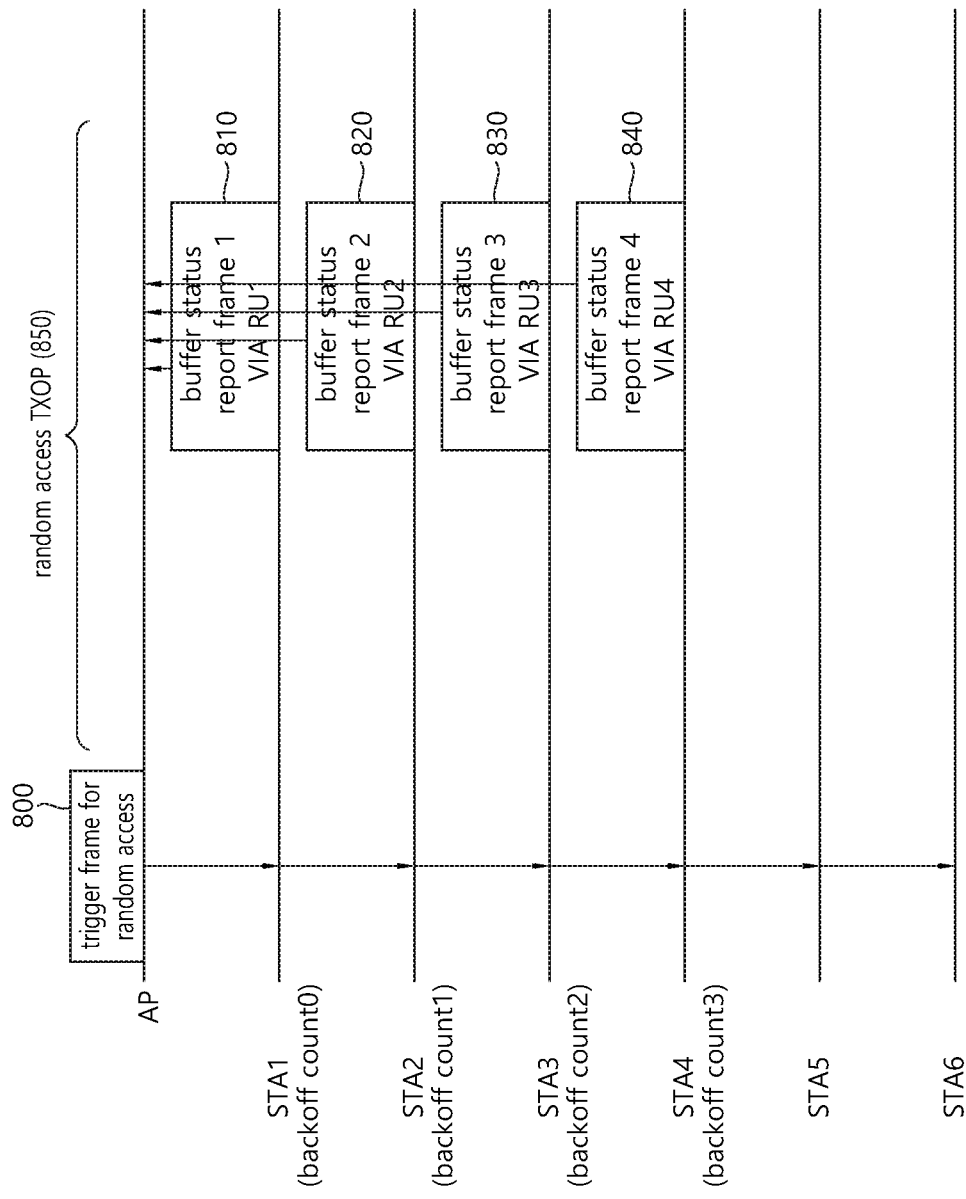
FIG. 8 is a conceptual view illustrating a method of triggering a buffer status report frame of an STA according to an embodiment of the present invention.

FIG. 8 is a conceptual view illustrating a method of triggering a buffer status report frame of an STA according to an embodiment of the present invention.

In FIG. 8, a channel access method of the STA on a random access TXOP 850 is disclosed. If a plurality of STAs perform channel access through random access on the random access TXOP 850 for transmission of a buffer status report frame, a collision may occur between buffer status report frames transmitted by the plurality of STAs.

Referring to FIG. 8, a plurality of frequency resource units (subchannels, subbands, or RUs) may be allocated as the random access TXOP 850 after a trigger frame 800 for random access is transmitted. Hereinafter, it is assumed that each of an RU1, an RU2, an RU3, and an RU4 is allocated as a transmission resource for transmission of a buffer status report frame. The trigger frame 800 for random access may transmit information regarding the allocated time resource/frequency resources as described above.

The plurality of STAs which have received the trigger frame 800 for random access may determine whether the buffer status report frame is transmitted through each of the plurality of frequency resource units. For example, each of the plurality of STAs may determine whether to transmit the buffer status report frame on the random access TXOP 850 through a backoff procedure. More specifically, the backoff procedure may be performed in a frequency resource unit. If the number of frequency resource units is 4 as in the above assumption, an STA which has selected 0 to 3 as the backoff count for the buffer status report may transmit the buffer status report frame on the random access TXOP 850 configured based on the trigger frame 800 for random access. The STA which has selected 0 to 3 as the backoff count may transmit the buffer status report frame on the random access TXOP 850 on the basis of UL MU transmission.

On the contrary, an STA which has selected a value greater than or equal to 4 as the remaining backoff counts cannot transmit the buffer status report frame on the random access TXOP 850.

Each of four STAs (STA1, STA2, STA3, and STA4) which have selected 0 to 3 as the back-off counts may randomly determine an RU which will transmit the buffer status report frame. Each of the four STAs (STA1, STA2, STA3, and STA4) may transmit the buffer status report frame on the randomly determined RU. Ideally, the STA1 may transmit a buffer status report frame1 810 through the RU1, the STA2 may transmit a buffer status report frame2 820 through the RU2, the STA3 may transmit a buffer status report frame3 830 through the RU3, and the STA4 may transmit a buffer status report frame4 840 through the RU 4.

According to another embodiment of the present invention, the STA may randomly perform channel access to transmit the buffer status report frame on the random access TXOP 850 without the backoff procedure.

Although the procedure of setting the broadcast TXOP based on the trigger frame for random access is described in FIG. 7 and FIG. 8, the aforementioned UL MU transmission procedure may also be performed for another trigger frame for triggering another frame other than the trigger frame for random access.

Figure 9:
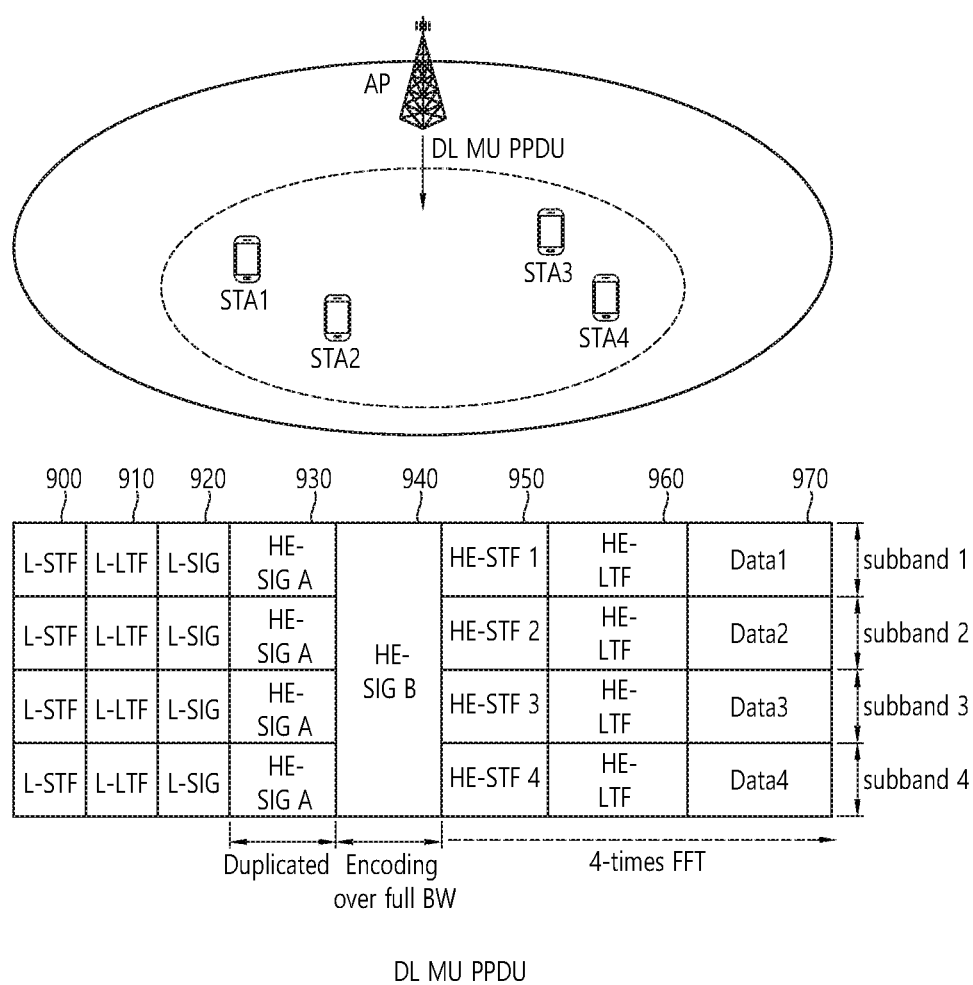
FIG. 9 is a conceptual view illustrating a downlink (DL) MU physical layer (PHY) protocol data unit (PPDU) format according to an embodiment of the present invention.

FIG. 9 is a conceptual view illustrating a DL MU PPDU format according to an embodiment of the present invention.

In FIG. 9, a DL MU PPDU format transmitted based on OFDMA by an AP is disclosed according to the embodiment of the present invention. The DL MU PPDU format may be used to deliver a trigger frame for random access, a UL MU trigger frame, or the like.

Referring to an upper portion of FIG. 9, a PHY header of a DL MU PPDU may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), and a data field (or a MAC payload). The PHY header may be divided into a legacy part before the L-SIG and a high efficiency (HE) part after the L-SIG.

An L-STF 900 may include a short training orthogonal frequency division multiplexing (OFDM) symbol. The L-STF 900 may be used for frame detection, automatic gain control (AGC), diversity detection, and coarse frequency/time synchronization.

An L-LTF 910 may include a long training OFDM symbol. The L-LTE 910 may be used for fine frequency/time synchronization and channel prediction.

An L-SIG 920 may be used to transmit control information. The L-SIG 920 may include information for a data rate and a data length.

An HE-SIG A 930 may include information for indicating an STA for receiving a DL MU PPDU. For example, the HE-SIG A 930 may include an identifier of a specific STA (or AP) for receiving the PPDU and information for indicating a group of the specific STA. Further, if the DL MU PPDU is transmitted based on orthogonal frequency division multiple access (OFDMA) or multiple input multiple output (MIMO), the HE-SIG A 930 may also include resource allocation information for receiving the DL MU PPDU of the STA.

Further, the HE-SIG A 930 may include color bits information for BSS identification, bandwidth information, a tail bit, a CRC bit, modulation and coding scheme (MCS) information for an HE-SIG B 940, symbol count information for the HE-SIG B 940, and cyclic prefix (CP) (or guard interval (GI)) length information.

The HE-SIG B 940 may include a length of physical layer service data unit (PSDU) for each STA, information regarding modulation and coding scheme (MCS), a tail bit, or the like. Further, the HE-SIG B 940 may include information for the STA for receiving the PPDU and OFDMA-based resource allocation information (or MU-MIMO information). If the OFDMA-based resource allocation (or MU-MIMO related information) is included in the HE-SIG B 940, resource allocation information may not be included in the HE-SIG A 930.

A field prior to the HE-SIG B 940 on the DL MU PPDU may be transmitted in a duplicated form in each of different transmission resources. In case of the HE-SIG B 940, the HE-SIG B 940 transmitted in some subchannels (e.g., subchannel 1, subchannel 2) may be an independent field containing individual information, and the HE-SIG B 940 transmitted in the remaining subchannels (e.g., subchannel 3, subchannel 4) may have a format in which the HE-SIG B 940 transmitted in other subchannels (e.g., subchannel 1, subchannel 2)) is duplicated. Alternatively, the HE-SIG B 940 may be transmitted on all transmission resources in an encoded form. A field next to the HE-SIG B 940 may include individual information for each of the plurality of STAs for receiving the PPDU.

An HE-STF 950 may be used to improve automatic gain control estimation in an MIMO environment or an OFDMA environment.

More specifically, an STA1 may receive an HE-STF1 transmitted through a subband1 from the AP, and may decode a data field1 by performing synchronization, channel tracking/prediction, and AGC. Similarly, an STA2 may receive an HE-STF2 transmitted through a subband2 from the AP, and may decode a data field2 by performing synchronization, channel tracking/prediction, and AGC. An STA3 may receive an HE-STF3 transmitted through a subband3 from the AP, and may decode a data field3 by performing synchronization, channel tracking/prediction, and AGC. An STA4 may receive an HE-STF4 transmitted through a subband4 from the AP, and may decode a data field4 by performing synchronization, channel tracking/prediction, and AGC.

An HE-LTF 960 may be used to estimate a channel in the MIMO environment or the OFDMA environment.

A size of IFFT applied to the HE-STF 950 and a field next to the HE-STF 950 may be different from a size of IFFT applied to a field prior to the HE-STF 950. For example, the size of IFFT applied to the HE-STF 950 and the field next to the HE-STF 950 may be four times greater than the size of IFFT applied to the field prior to the HE-STF 950. The STA may receive the HE-SIG A 930, and may be instructed to receive a downlink PPDU on the basis of the HE-SIG A 930. In this case, the STA may perform decoding on the HE-STF 950 and the field next to the HE-STF 950 on the basis of a changed FFT size. On the contrary, if the STA is not instructed to receive the downlink PPDU on the basis of the HE-SIG A 930, the STA may stop decoding and may configure a network allocation vector (NAV). A cyclic prefix (CP) of the HE-STF 950 may have a size greater than a CP of another field, and for this CP duration, the STA may perform decoding on the downlink PPDU by changing the FFT size.

Figure 10:
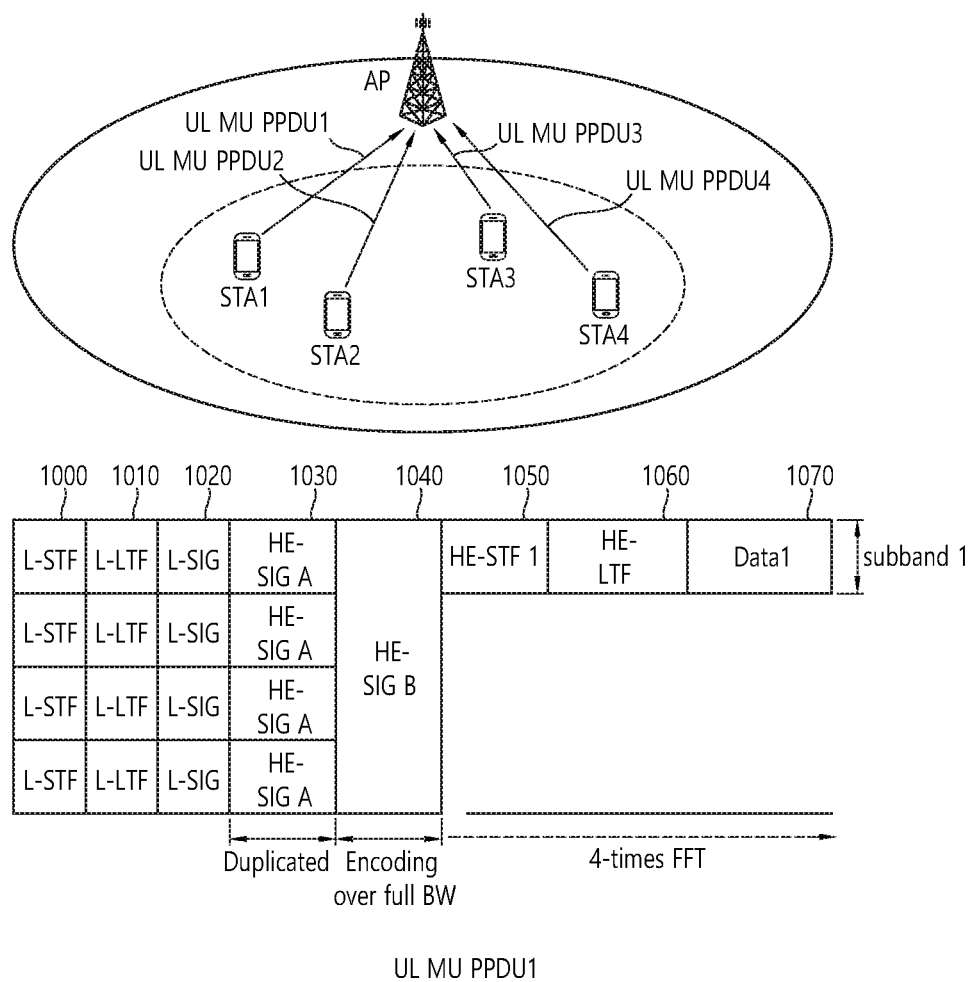
FIG. 10 is a conceptual view illustrating transmission of a UL MU PPDU according to an embodiment of the present invention.

FIG. 10 is a conceptual view illustrating transmission of a UL MU PPDU according to an embodiment of the present invention.

Referring to FIG. 10, a plurality of STAs may transmit the UL MU PPDU on the basis of UL MU OFDMA to an AP. In FIG. 10, only a UL MU PPDU1 transmitted by an STA1 is disclosed for example. The UL MU PPDU may be used to deliver a buffer status report frame and a UL MU data frame.

An L-STF 1000, an L-LTF 1010, an L-SIG 1020, an HE-SIG A 1030, and an HE-SIG B 1040 may perform the function disclosed in FIG. 9. Information included in a signal field (the L-SIG 1020, the HE-SIG A 1030, and the HE-SIG B 1040) may be generated based on information included in a signal field of a received DL MU PPDU.

The STA1 may perform uplink transmission through a full bandwidth until the HE-SIG B 1040, and may perform uplink transmission through an allocated bandwidth starting from an HE-STF 1050. As described above in FIG. 8, the STA1 may select a frequency resource (e.g., subband 1) for randomly transmitting a buffer status report frame, and may transmit the buffer status report frame on the selected frequency resource. The buffer status report frame may be included in the data field 1.

It may be assumed that a subband 1 to a subband 4 are used as a random access TXOP and the STA1 to the STA4 are STAs capable of transmitting the buffer status report frame on the random access TXOP. In an ideal case, the STA2 may transmit a data field2 containing an HE-STF 2 and an STA2's buffer status report frame through a subband2 allocated by the AP, the STA3 may transmit a data field3 containing an HE-STF3 and an STA3's buffer status report frame through a subband3 allocated by the AP, and the STA4 may transmit a data field4 containing an HE-STF4 and an STA4's buffer status report frame4 through a subband4 allocated by the AP.

Figure 11:
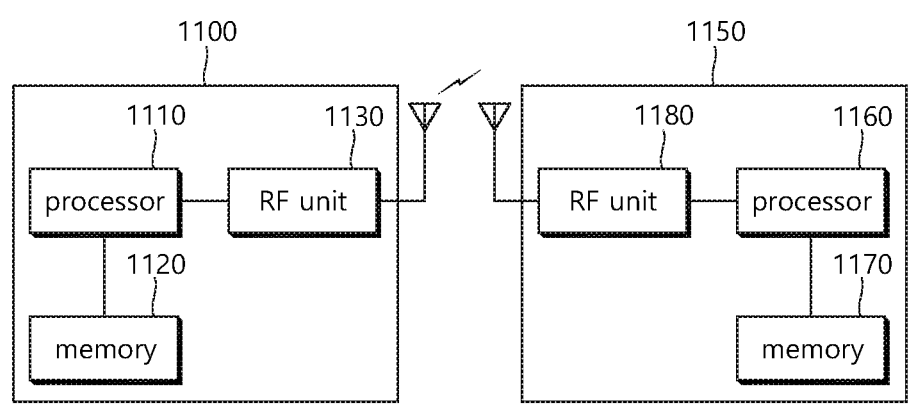
FIG. 11 is a block diagram illustrating a wireless device according to an embodiment of the present invention.

FIG. 11 is a block diagram illustrating a wireless device according to an embodiment of the present invention.

Referring to FIG. 11, an AP 1100 includes a processor 1110, a memory 1120, and a radio frequency (RF) unit 1130.

The RF unit 1130 may be coupled to the processor 1110 to transmit/receive a radio signal.

The processor 1110 may implement the functions, procedures, and/or methods proposed in the present invention. For example, the processor 1110 may be configured to perform an operation of the AP according to the aforementioned embodiment of the present invention. The processor may perform the operation of the AP disclosed in the embodiment of FIG. 1 to FIG. 10.

For example, the processor 1110 may be configured to transmit a trigger frame for random access, and receive at least one buffer status report frame from at least one station (STA) on a random access transmission opportunity (TXOP) configured based on the trigger frame for random access. The random access TXOP may be allocated to attempt channel access for transmission of the buffer status report frame of each of a plurality of unspecific STAs, and each of the at least one STA may be an STA which has succeeded in the channel access among the plurality of unspecific STAs. The at least one STA may be determined based on a backoff procedure in an allocated frequency resource unit by considering information regarding the number of frequency resource units allocated for the random access TXOP.

An STA 1150 includes a processor 1160, a memory 1170, and a radio frequency (RF) unit 1180.

The RF unit 1180 may be coupled to the processor 1160 to transmit/receive a radio signal.

The processor 1160 may implement the functions, procedures, and/or methods proposed in the present invention. For example, the processor 1160 may be configured to perform an operation of the STA according to the aforementioned embodiment of the present invention. The processor 1160 may perform the operation of the STA disclosed in the embodiment of FIG. 1 to FIG. 10.

For example, the processor 1160 may receive a trigger frame for random access, and may transmit at least one buffer status report frame on a random access transmission opportunity (TXOP) configured based on the trigger frame for random access.

The processors 1110 and 1160 may include application-specific integrated circuits (ASICs), other chipsets, logical circuits, data processing devices, and/or converters for mutually converting a baseband signal and a radio signal. The memories 1120 and 1170 may include a read-only memory (ROM), a random access memory (RAM), a flash memory, a memory card, a storage medium and/or other storage devices. The RF units 1130 and 1180 may include at least one antenna to transmit and/or receive the radio signal.

When the above-described embodiment is implemented in software, the above-described scheme may be implemented using a module (process or function) which performs the above function. The module may be stored in the memories 1120 and 1170 may be and executed by the processors 1110 and 1160. The memories 1120 and 1170 may be disposed to the processors 1110 and 1160 internally or externally and connected to the processors 1110 and 1160 using a variety of well-known means.

What is claimed is:

1. A method of transmitting a buffer status report (BSR) in a wireless local area network (WLAN), the method performed by a station (STA) and comprising:
   receiving, from an access point (AP), first control information related to the BSR;
   receiving, from the AP, a trigger frame which triggers uplink multiple user (UL-MU) transmission, wherein the trigger frame includes second control information related to frequency resources used for a plurality of stations (STAs); and
   after receiving the trigger frame, determining whether to transmit the BSR of the STA to the AP on at least one of the frequency resources based on the first control information and a back-off count of the STA,
   wherein the BSR of the STA is determined to be transmitted when the back-off count of the STA becomes zero.

2. The method of claim 1, wherein the back-off count decrements to zero through a back-off procedure performed by the STA.

3. The method of claim 1, wherein the frequency resources are non-dedicated frequency resources, which are not exclusively allocated by the AP to a specific STA, and the at least one of the frequency resources is randomly selected by the STA when the back-off count of the STA becomes zero.

4. A station (STA) in a wireless local area network (WLAN), comprising:
   a memory storing a signal received from an access point (AP); and
   a processor operatively coupled to the memory,
   wherein the processor is configured to:
   receive, from the AP, first control information related to a buffer status report (BSR);
   receive, from the AP, a trigger frame which triggers uplink multiple user (UL-MU) transmission,
   wherein the trigger frame includes information related to frequency resources used for a plurality of stations (STAs); and
   after receiving the trigger frame, determine whether to transmit the BSR of the STA to the AP on at least one of the frequency resources based on the first control information and a back-off count of the STA,
   wherein the BSR of the STA is determined to be transmitted when the back-off count of the STA becomes zero.

5. The STA of claim 4, wherein the back-off count decrements to zero through a back-off procedure performed by the STA.

6. The STA of claim 4, wherein the frequency resources are non-dedicated frequency resources, which are not exclusively allocated by the AP to a specific STA, and the at least one of the frequency resources is randomly selected by the STA when the back-off count of the STA becomes zero.

* * * * *